United States Patent

[11] 3,627,253

[72] Inventors: Gerard Germain Hericourt;
Alain Barriere, Montbeliard, both of France
[21] Appl. No. 44,784
[22] Filed June 9, 1970
[45] Patented Dec. 14, 1971
[73] Assignees Automobiles Peugeot
Paris, ;
Regie National des Usines Renault
Billancourt, France
[32] Priority Sept. 10, 1969
[33] France
[31] 6930765

[54] DEVICE FOR INTERLOCKING TWO RELATIVELY SLIDABLE ELEMENTS
10 Claims, 7 Drawing Figs.

[52] U.S. Cl. ................................................. 248/429, 74/527
[51] Int. Cl. ............................................. F16m 13/00

[50] Field of Search.............................................. 248/429; 74/527, 533, 535

[56] References Cited
UNITED STATES PATENTS
1,964,405  6/1934  Nenne ........................... 248/429
3,288,422  11/1966  Krause .......................... 248/429
3,450,425  6/1969  Leonhardt ...................... 74/533 X Primary Examiner—William H. Schultz
Attorney—Burns, Doane, Benedict & Swecker ABSTRACT: Device interlocking two relatively slidable elements, such as a vehicle seat and a floor.

The device comprises a rack integral with one element, a slideway integral with the rack, slide means integral with the other element and movable along the slideway. Two locking rollers carried by the slide means are releasably engageable with the rack. A cam rotatable on the slide means maintains the rollers engaged with the rack in an operative position and allows the rollers to be withdrawn from the rack in an inoperative position. A control device shifts the cam to its inoperative position in opposition to spring means.

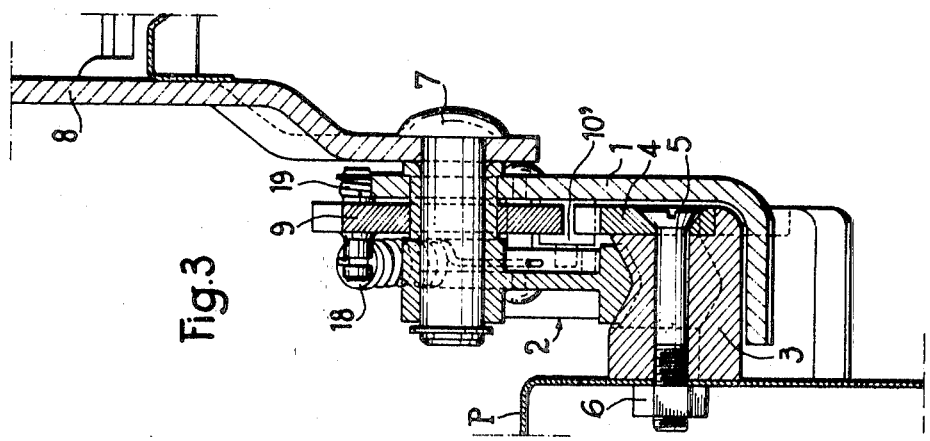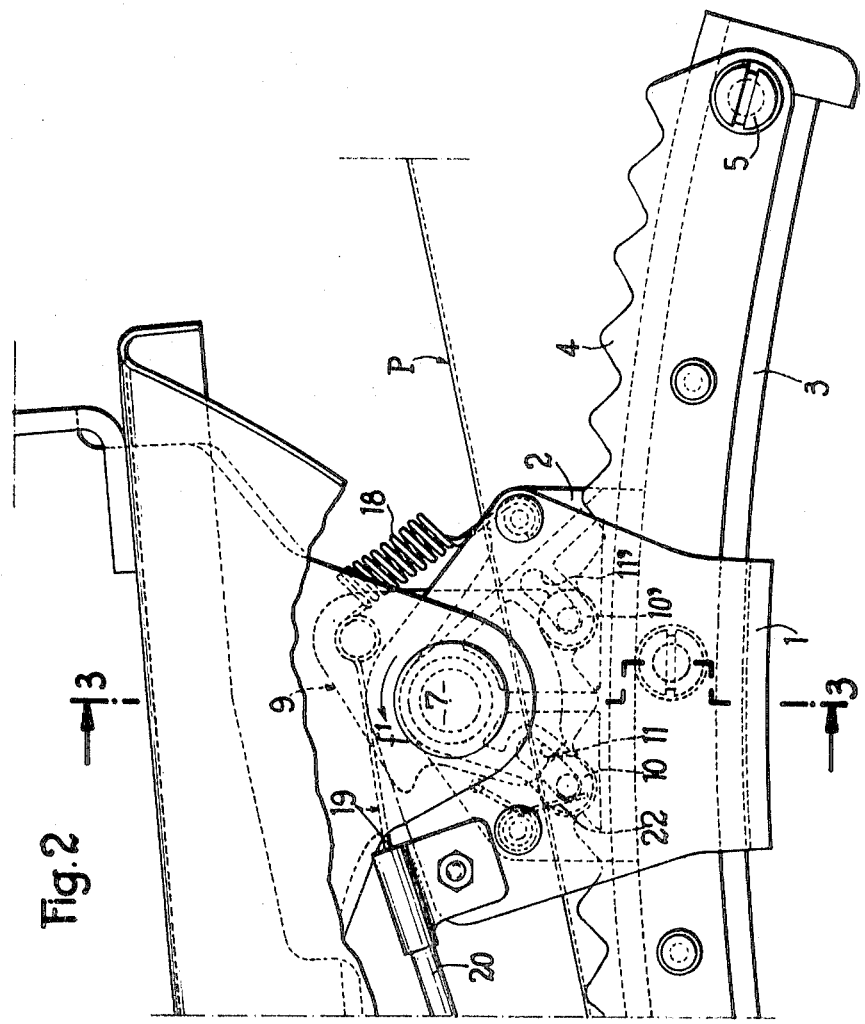

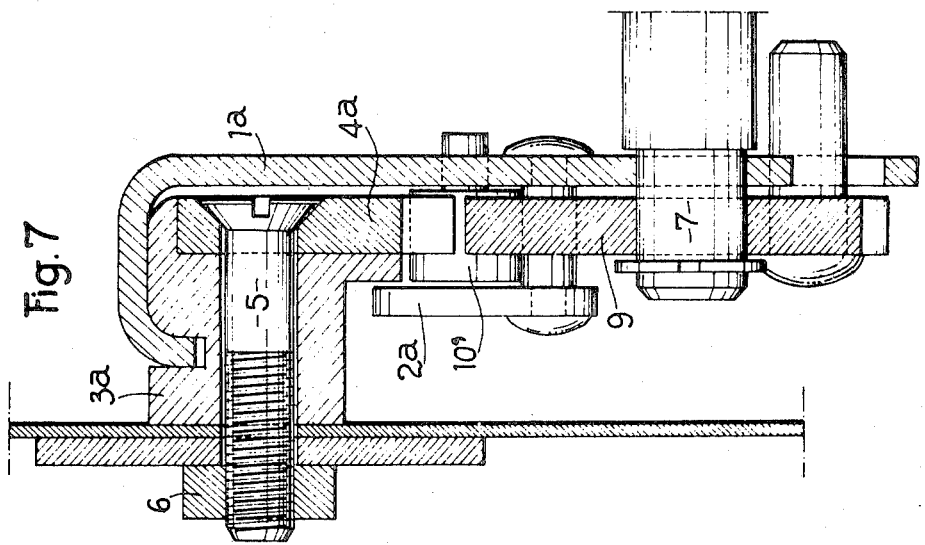
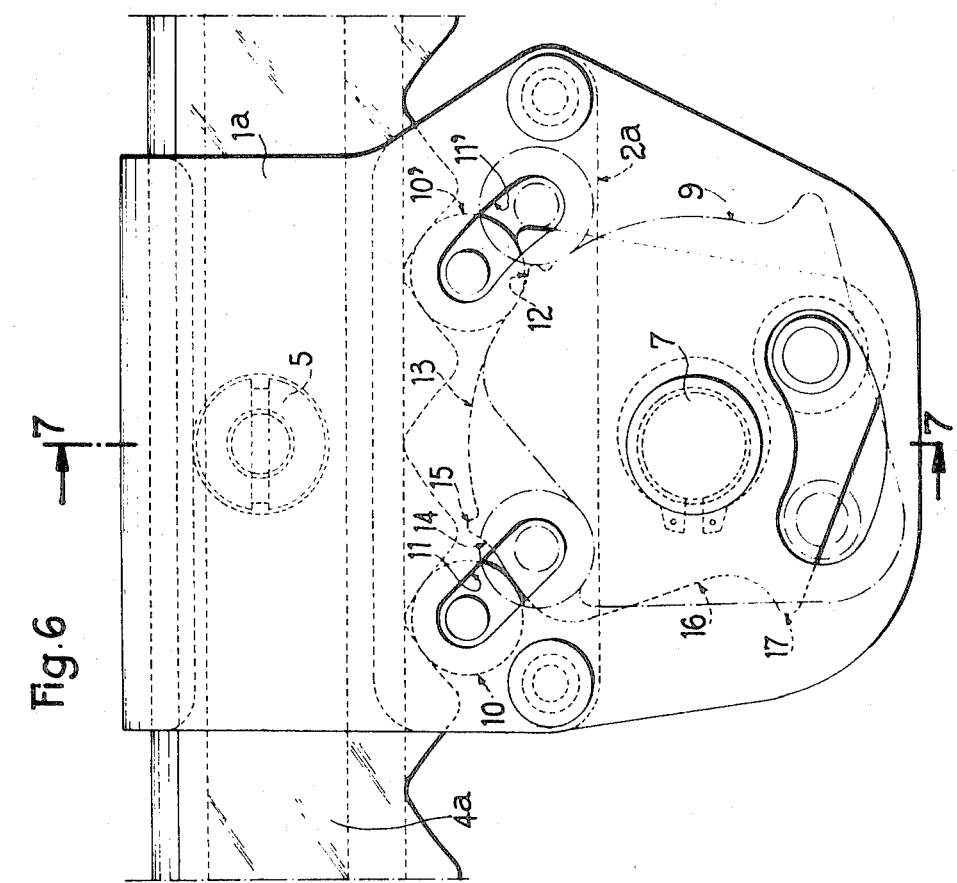

DEVICE FOR INTERLOCKING TWO RELATIVELY SLIDABLE ELEMENTS

The present invention relates to devices for interlocking two elements undergoing a rectilinear or curvilinear relative sliding motion. It is particularly applicable to seats of vehicles which are adjustable in the longitudinal direction.

In most known locking devices for longitudinally adjustable seats, the seat is held stationary by the engagement of a finger member integral with the seat in an aperture or recess of a rack integral with the floor of the vehicle, or inversely. Now, owing to wear of the recesses or the slackening of a resiliently yieldable holding element, it sometimes happens that the assembly looses its efficiency, which can have serious consequences for the safety of the users, in particular upon impact.

The object of the invention is to remedy these drawbacks and to provide an improved device for interlocking two elements undergoing a relative sliding motion whose efficiency is unaffected by wear and which affords complete safety in respect of the two directions of relative movement between the elements owing to the absence of an unlocking reaction.

The invention provides a locking device of the type having a rack integral with one of the elements and associated locking means carried by the other element. The device comprises in combination: a slideway integral with the rack; slide means integral with the other element and movable along the slideway which it encompasses; two locking rollers movably mounted on the slide means between a locking position in which they are engaged in two recesses in the rack and an unlocking position in which they are withdrawn from the recesses; a cam movable on the slide between an inoperative position in which the rollers are withdrawn and an operative position in which it maintains the rollers engaged in the recesses; resiliently yieldable means biasing the cam to said operative position for locking and a control device for shifting the cam to said inoperative position; and means for withdrawing the rollers when the cam pivots to its inoperative position.

According to another feature, in the locked position the planes tangent to the axes of the cam and of the teeth of the rack at the point of contact with each roller are perpendicular to the plane containing the axes of the roller and of the cam.

Another object of the invention is to provide applications of the aforementioned locking device and in particular an adjustable vehicle seat provided with at least one such device.

Further features and advantages of the invention will be apparent from the ensuing description with reference to the accompanying drawings.

In the drawings:

FIG. 2 is a side elevational view of the locking device;

FIG. 3 is a sectional view taken along line 3—3 of FIG. 2;

FIG. 6 is a side elevational view of a modification of the device, and

FIG. 7 is a sectional view taken along line 7—7 of FIG. 6.

FIG. 1 shows an embodiment of the invention applied to a seat S which comprises in front a link $a$ pivoted to the floor P.

Figure 1:
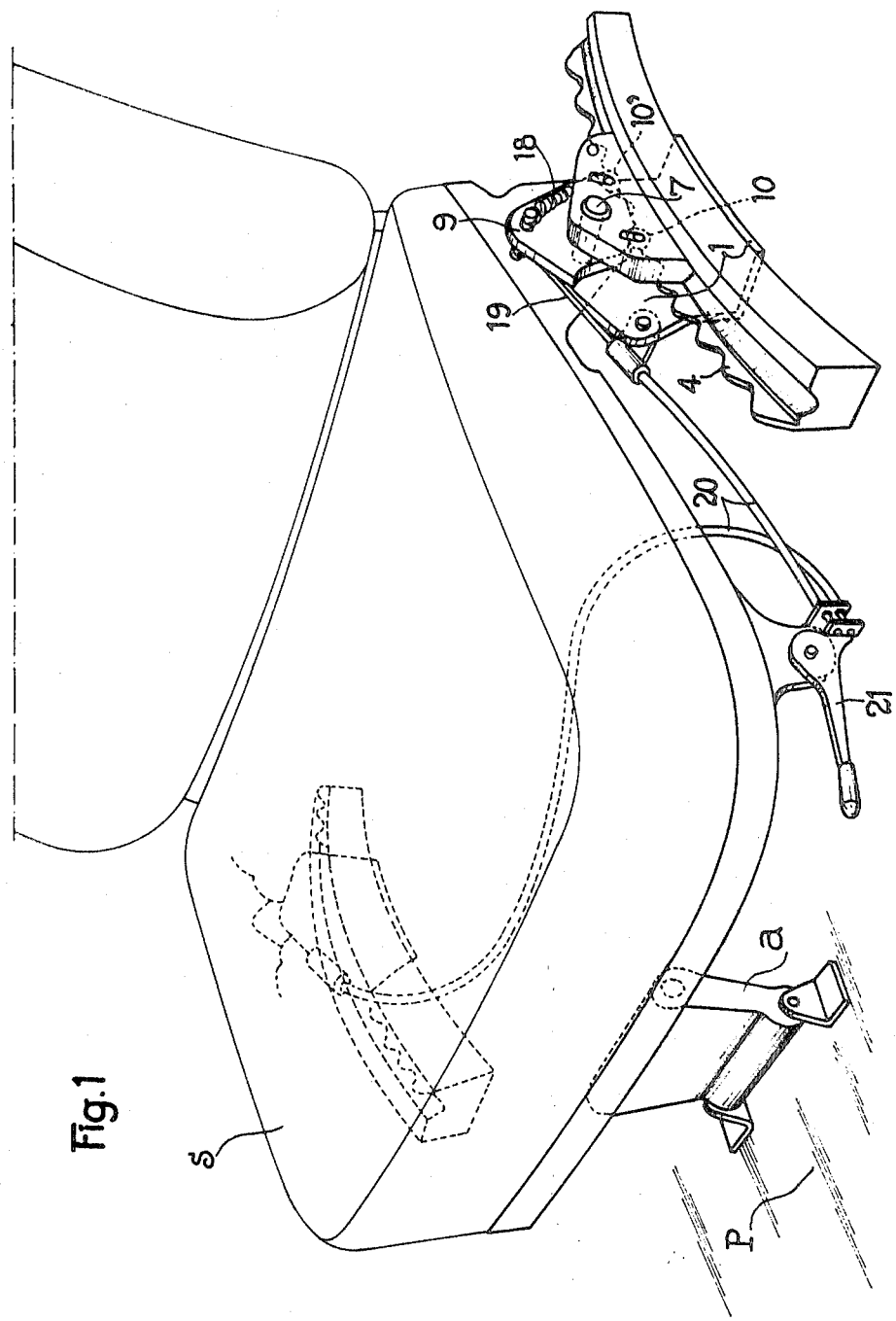
FIG. 1 is a partial perspective view of a seat provided with a locking device according to the invention.

According to this embodiment, the seat S comprises, at the rear and on each side, a slide means, formed by a half-fork member 1 and a slide block 2, partially encompassing a slideway 3 which is curvilinear or rectilinear and integral with the floor P.

Fixed to one of the sides of the slideway 3 is a rack 4 and the rack and slideway assembly is secured to the floor P for example by screws 5 and nuts 6.

The member 1 and the block 2 are mounted on a spindle 7 integral with the frame 8 of the seat.

The block 2 bears and slides on the upper face of the slideway 3 to which it transmits the weight of the rear part of the seat S and the lower portion of the member 1, which is formed over at right angles under the slideway, opposes any forward tilting of the seat.

A cam 9 is pivotably mounted on the spindle 7 between the member 1 and the block 2 in the plane of the rack 4. This cam is adapted to act on two rollers 10 and 10' also maintained between the member 1 and the block 2. These rollers are bodily movable in the plane of the cam and guided in two apertures 11 and 11' in the block 2.

The periphery of the cam 9 comprises (FIGS. 4 and 5): a first projecting portion 12, two particular portions 13 and 14 which are concentric with the axis of the spindle 7 and separated by a second projecting portion 15, a ramp 16 and a third projecting portion 17.

The aperture 11' guiding the roller 10' is arcuate and concentric with the axis of the spindle 7 and the aperture 11 guiding the roller 10 extends roughly in a radial plane containing the axis of the spindle.

Figure 4:
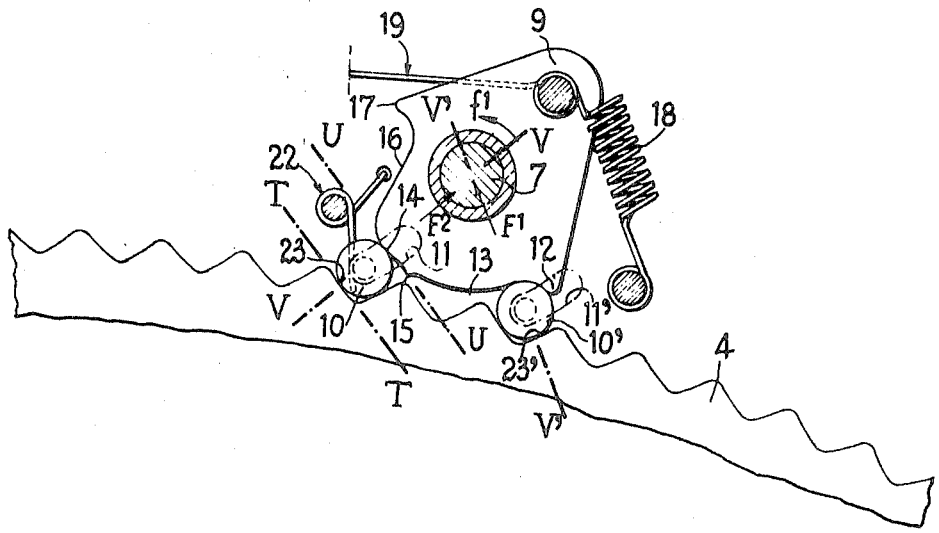
FIG. 4 is a diagrammatic view of the device in the locking position.
Figure 5:
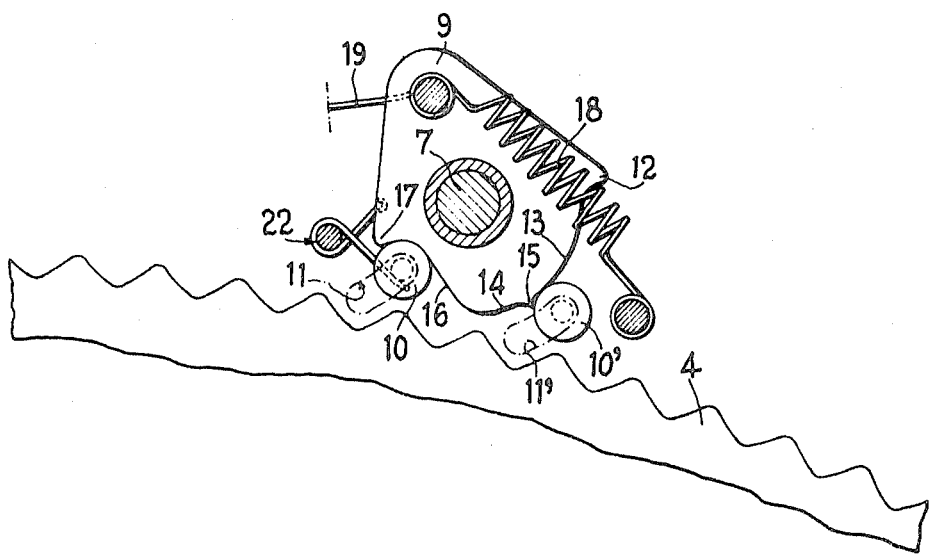
FIG. 5 is a diagrammatic view of the device in the unlocking position.

The cam 9 is rotatable between an operative locking position shown in FIGS. 2 and 4 and an unlocking position shown in FIG. 5. A tension spring 18 connected between the member 1 and the cam 9 biases the latter to the operative locking position.

The cam is turned in the unlocking direction of arrow $f'$ (FIGS. 2 and 4), for example by pulling on a cable 19 slidable in a fixed sheath 20. A single lever 21 (FIG. 1), shifted by the user, enables the two locking devices located on each side of the seat to be actuated simultaneously (it must be understood that any other control device could be employed, for example a linkage arrangement).

Means are provided for automatically shifting the rollers away from the rack when the cam 9 is shifted from the locking position shown in FIG. 4. Thus, the roller 10 is biased by a spring 22 whereas the roller 10' is shifted by the projecting portion 15. (FIG. 5).

In the position of rest, that is, in the locking position (FIGS. 2 and 4), the rollers 10 and 10' are trapped between two recesses or bottoms between teeth of the rack 4 and the part-circular portion 13, 14 of the cam 9.

Preferably the flanks of the teeth have a part-circular face so that the operative flanks 23 and 23' of the recesses of the rack are concentric with the axis of the spindle 7 of the cam 9. More precisely, the planes tangent to the teeth of the rack and to the cam at the point of contact with each roller are roughly perpendicular to a plane containing the axis of the corresponding roller and that of the cam. Thus, in respect of the roller 10 (FIG. 4), the planes T—T and U—U are perpendicular to the plane V—V. However, a roughly equivalent result is obtained if the flanks of the teeth are rectilinear, the slope being so chosen that each of the operative flanks 23 and 23' are respectively perpendicular to the planes V—V or V'—V' containing the axis of the corresponding roller and the axis of the cam spindle 7.

The advantages of this arrangement are the following:

No unlocking reaction which might tend to rotate the cam 9;

No reaction tending to urge the rollers 10, 10' towards the crest of the teeth of the rack 4;

No reaction on the roller guides 10, 10'.

Unlocking is effected by pulling on the cable 19, which causes the cam 9 to rotate in the direction of arrow $f^1$. In the course of this movement, the projecting portion 15 of the cam urges the roller 10' away from the rack. At the same time, the roller 10, biased by its spring 22, slides along the ramp 16 of the cam and is disengaged from the rack 4. The projection portion 17 of the cam, in being applied against the roller 10, constitutes an unlocking stop. The assembly, integral with the seat, can then be shifted by sliding the slide block 2 along the slideway 3.

Locking is effected by allowing the cam 9 to return to the position shown in the FIGS. 3 and 4 under the action of the spring 18. In the course of this movement, the rollers 10 and 10' are urged towards the bottom of the recesses between the teeth of the rack 4 by the ramp 16 and by the projecting portion 12 respectively. The latter moreover constitutes a locking stop.

In the modification of the invention shown in FIGS. 6 and 7, the locking device is identical to the device just described but located under the rack 4$^a$ which has its teeth facing downwardly.

In this case, the half-fork member 1$^a$ transmits the weight to the slideway 3$^a$ and comprises apertures 11 and 11' for guiding the rollers 10 and 10'. The slide block 2 of the first embodiment is replaced by a simple counterplate 2$^a$ which acts as transverse retaining means for the cam 9 and the rollers.

This modification operates in the same way as the previously described embodiment.

It must be understood that the invention is also applicable to the case in which the locking device is fixed and the rack movable. The rack and the slideway can be rectilinear or curvilinear depending on the path of the relative sliding between the two elements to be locked.

Having now described my invention what I claim and desire to secure by Letters Patent is:

1. A device for interlocking two elements undergoing a relative sliding motion, comprising a rack integral with a first of said elements; a slideway integral with said rack, said rack having teeth and recesses disposed between said teeth; slide means integral with a second of said elements and movable along said slideway which it encompasses; two locking rollers carried by said slide means and movable between a locking position in which they are engaged in two of said recesses in said rack and an unlocking position in which they are withdrawn from the recesses; a cam mounted on the slide means to be movable between an inoperative position in which said rollers are withdrawn from said rack and an operative position in which said cam maintains said rollers engaged in said recesses; resiliently yieldable means biasing said cam to said operative position for locking; a control device for shifting said cam to said inoperative position; and means for withdrawing said rollers from said rack when said cam pivots to said inoperative position.

2. A device as claimed in claim 1, wherein said cam is rotatable about an axis and, in said locking position, planes tangent to the faces of the cam and said teeth of the rack at points of contact with each roller are perpendicular to a plane containing the axis of the roller and the axis of rotation of the cam.

3. A device as claimed in claim 2, comprising arcuate guide means for one of said rollers concentric with the axis of rotation of said cam, said cam having a projecting portion for shifting the roller in a direction for its withdrawal from said rack.

4. A device as claimed in claim 1, wherein at least one of said rollers is shifted by a ramp of said cam in opposition to the action of a spring.

5. A device as claimed in claim 1, wherein said cam is rotatable about a spindle and said slide means comprises the combination of a half-fork and a slide block interposed between said spindle and said slideway.

6. A device as claimed in claim 5, wherein said rollers are guided in apertures formed in said slide block.

7. A device as claimed in claim 1, wherein said slide means comprises a half-fork and a lateral retaining member and apertures in said half-fork for guiding said rollers.

8. A device as claimed in claim 1, wherein said teeth of the rack have part-circular flanks.

9. A device as claimed in claim 1, wherein said teeth of the rack have rectilinear flanks.

10. Structure comprising an element in the form of an adjustable vehicle seat, an element in the form of a vehicle floor, and a device for interlocking said elements, said device comprising a rack integral with a first of said elements; a slideway integral with said rack, said rack having teeth and recesses disposed between said teeth; slide means integral with a second of said elements and movable along said slideway which it encompasses; two locking rollers carried by said slide means and movable between a locking position in which they are engaged in two of said recesses in said rack and an unlocking position in which they are withdrawn from the recesses; a cam mounted on the slide means to be movable between an inoperative position in which said rollers are withdrawn from said rack and an operative position in which said cam maintains said rollers engaged in said recesses; resiliently yieldable means biasing said cam to said operative position for locking; a control device for shifting said cam to said inoperative position; and means for withdrawing said rollers from said rack when said cam pivots to said inoperative position.

* * * * *